June 15, 1926.
H. G. GERE ET AL
FISHING LURE
Filed August 1, 1925
1,589,065
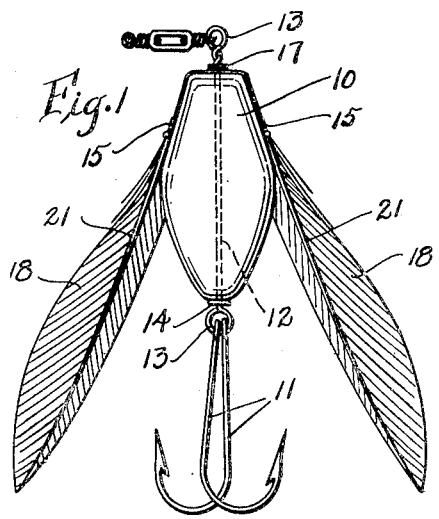
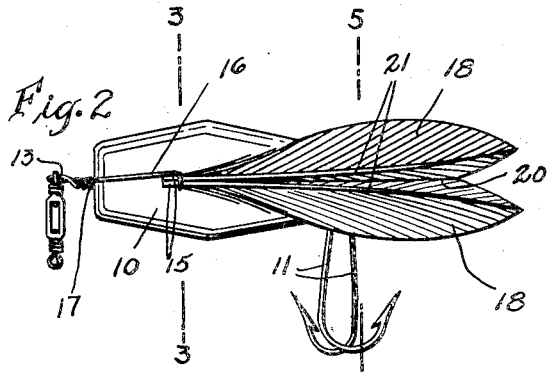
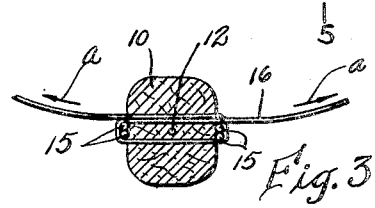
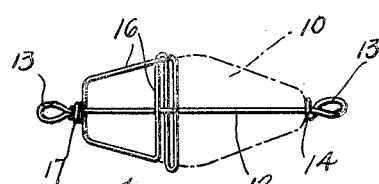
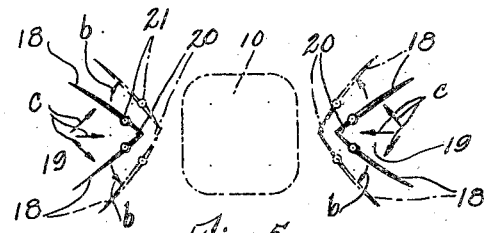
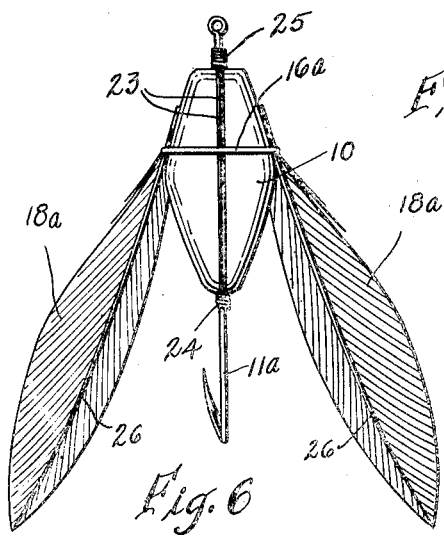
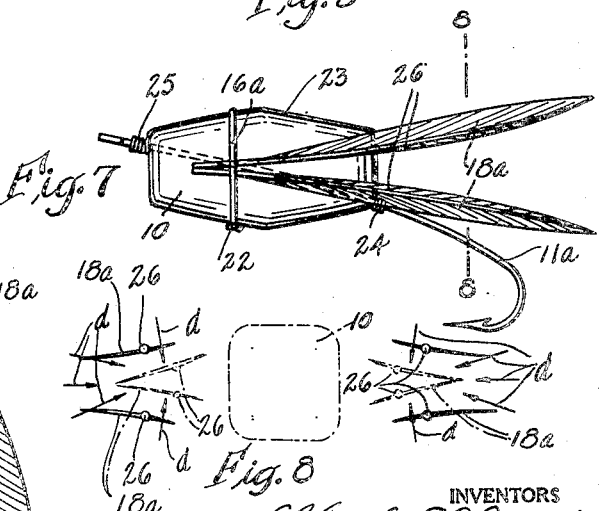
INVENTORS
H. G. Gere & E. A. Carpenter
BY
ATTORNEY Patented June 15, 1926.

1,589,065

UNITED STATES PATENT OFFICE.

HARRY G. GERE, OF MAPLEWOOD, AND EDWARD A. CARPENTER, OF MORRISTOWN, NEW JERSEY.

FISHING LURE.

Application filed August 1, 1925. Serial No. 47,394.

This invention relates to fishing lures and particularly to devices of that nature which are adapted to simulate the action of a bug or other insect.

Among the objects of this invention is to provide a fishing lure comprising a plurality of wing members so positioned that the resistance of the water may be utilized as the lure is moved in the water for causing a vibration of said wing members to simulate the movement of the wings of an insect.

Another object of this invention is to provide a fishing lure comprising wing members which are so disposed that the resistance of the water as the fishing lure is moved therein may be most effectively utilized for causing the water to ripple all round the lure, whereby a movement or action of a living insect is simulated.

Still another object of this invention is to provide a fishing lure comprising a buoyant body and wing members preferably of shafted wing feathers or the like secured to the body in position to co-operate with the water, and novel fastening means for retaining said wing feathers in relatively rigid predetermined engagement with said body.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings in which like reference characters designate the same parts in the several views, and in which—

Figure 1 is a plan view showing our fishing lure.

Fig. 2 is a side elevation of the same.

Fig. 3 is a sectional view on the line 3—3 of Fig. 2 showing the method of attaching the wing members to the body.

Fig. 4 is a diagram showing the attachment means in perspective.

Fig. 5 is a section on the line 5—5 of Fig. 2 showing the action of the wing members should the lure be drawn through the water.

Fig. 6 is a plan view of a modification.

Fig. 7 is a side elevation of the same.

Fig. 8 is a section on the line 8—8 of Fig. 7 showing the deflection of the wing members.

Referring now more specifically to the drawings, we show our invention as comprising a supporting or attaching member such as a buoyant body 10 which may be made of cork or other suitable material and having co-operation with hook means which are borne thereby such as the hooks 11 which are suspended from a shank member 12 which passes longitudinally through the body and is provided with eyes 13 at both ends, a suitable swivel connection or the like being preferably secured to the forward end thereof. The hooks 11 are preferably disposed with their point portions in outward relation to each other so that their effectiveness for catching a fish is greatly increased. In making the eyes 13 upon the shank 12 a turn of wire 14 is provided to act as abutment means at one end of the body to secure the shank in fixed engagement therein. The body is beveled along the sides thereof and a plurality of wing members 18 are secured to the body at said sides so as to lie in outwardly disposed or flaring angular relation with respect to each other. Preferably said members consist of chicken wing feathers and are secured to the body solely at the quills 15. A flexible fastening member 16 is threaded through the body for engaging the wing members at the sides thereof and having connection with said shank whereto it is rigidly anchored as shown at 17. More specifically, said flexible member comprises a wire which is passed transversely through the body to engage the wing members at one side thereof as by means of a loop or the like and then passed again through the body in a reverse direction to engage the wing members upon the opposite side of the body and finally returned again through the body in a transverse direction so that the end portions of the flexible member lie disposed upon opposite sides of the body and in position to be engaged with the shank on the forward end of the lure as set forth hereinbefore. It will be observed that by exerting a pull or tension on said flexible member in the direction of arrows $a$, the quills will be rigidly secured to the body and preferably the cork will be somewhat compressed so that a slight concavity will be formed within which the quills will lie to retain the wing members in fixed predetermined adjustment or position. Moreover, since said flexible member is anchored from opposite sides of the body, the forces tending to retain the flexible member under tension balance each other so that the necessary stability is produced. Said fastening means are thus adapted particularly for simple and efficient construction and for a long life of the lure. The shank 12 may be passed through the body in any desired relation with respect to the fastening means but preferably between the various turns thereof as shown in Figs. 3 and 4.

The wing members 18 are so disposed with their natural outer or convex surfaces inward or toward each other that as the fisherman moves the lure in the water, as by wiggling the tip of the rod laterally, the resistance of the water will tend to cause the wing members to be deflected toward each other with the result that the water is caused to ripple all round the lure, thus creating the same kind of disturbance as is caused by a bug in the water, trying to swim or fly. To secure the most effective operation of the wing members in this manner they are disposed to flare and curve outward with respect to each other and from the sides of the body as set forth hereinbefore. The angle or outward flare is preferably rather considerable as shown so that a very marked and noticeable rippling of the water due to the action of the tips of the wing members will be produced. Moreover, we provide a plurality of wing members upon each side of said body arranged preferably to co-operate with each other to present a combined working face to the water to increase the resistance aforesaid and render a maximum the total disturbance of the water. More specifically, said wing members are arranged to lie at an angle to each other transversely thereof and preferably so as to form a channel 19 therebetween, said channel being thus disposed laterally of said body and at an outward inclination to the axis thereof so that the water will lie effectively between the wing members and cause the same to move in the position shown in dotted lines in Fig. 5 should the lure be drawn through the water. The wing members are arranged to lie in closer proximity to each other along the side edges thereof which are nearer to the body than along the other side edges, thus forming an apex 20 of said channel. The shafts 21 of said wing members are disposed in relative proximity to said apex so as to permit the wings to tend to be slightly rotated in the direction of arrows b, thus retaining the inner side edge portions of said wing members in continuous engagement with each other. Said wing members will thus be seen to experience a combined movement laterally toward said body and outwardly of each other to increase the width of said channel and consequently the effect of the working face thereof. The directions in which the water reacts cause such movement of the wing members when the fishing lure is drawn through the water as is indicated by the arrows c. Said wing members may be formed of any suitable material, but for the sake of simplicity are composed of natural feathers from chickens or other birds and are chosen of the required size and stiffness for the effective accomplishment of the simulation of the action of an insect or the like as set forth herein.

In Fig. 6 we show a modification of our invention in which a hook $11^a$ is passed directly through the body at an inclination to the longitudinal axis thereof so that the point portion thereof lies positioned in a permanent outward direction from said body. Wing members $18^a$ are positioned in outwardly flared relation with respect to each other at the sides of the body, a plurality of wing members being provided at each side. Means for fastening said wing members to the body comprises a flexible member such as a wire $16^a$ which is carried around the body in a transverse direction and bound together beneath the same as shown at 22. To cause the hook to be retained in rigid engagement with the body a wire 23 is coiled around the portions thereof which project from the ends of the body as shown at 24 and 25, said wire being preferably extended across the body twice so as to insure that the connections thereof with said hooks will not loosen.

The wing members $18^a$ are so disposed that those at a side of said body flare outward from each other toward the tips. Moreover, the wing members lie in more nearly flat horizontal position as shown in Fig. 8, but with their outer side edges in somewhat closer proximity to each other than their inner side edges so that should the lure be drawn through the water a resistance of the water will be operative for setting up forces in the direction of arrows d, to cause the wing members at a side of said body to move toward each other as shown in dotted lines. Moreover, the shafts 26 of said members or feathers are disposed in closer proximity to said inner edges so that the outer side portions of said wing members may be caused to move into position adjacent to each other to present a combined working face to the water to increase the effective resistance and consequently the deflection of the wing members upon the side of the body toward each other and likewise toward the longitudinal axis of said body.

Our invention thus is seen as comprising a fishing lure having a plurality of wing members or feathers which are operative for simulating the action of an insect's wings or the like and which are arranged for this purpose in outwardly disposed position at the sides of a body or other supporting means, a plurality of said members being arranged at each side of said body to co-operate with each other to present a combined working face and render the resistance of the water at a maximum for causing the most marked rippling or disturbance of the water when the lure is vibrated, as set forth.

Our invention is also seen to comprise fastening means for securing said wing members in rigid predetermined position at the sides of said body, said fastening means lending itself particularly to simple and inexpensive manufacturing. We have found that a fishing lure constructed along the lines indicated herein is very efficient for catching fish and is thoroughly reliable in operation.

We claim:

1. In a fishing lure, the combination of a buoyant supporting body having a forwardly tapered front end, hook means borne by said body, and a plurality of wing members secured to the body and comprising shafted feathers positioned at the tapering sides thereof and extending rearward with their tips at a relatively large outward laterally angular flare from the longitudinal center of the body due to said taper.

2. A fishing lure adapted particularly to simulate the vibration of an insect's wings comprising a body, a forwardly tapered front end, hook means, and a plurality of wing members co-operating with the body, each of said wing members being in the nature of a shafted bird feather and positioned at a tapering side of the body and extending outward and rearward at a relatively considerable angle and with its convex surface directed toward the central longitudinal axis of the body.

3. In a fishing lure adapted particularly to simulate the vibration of an insect's wings comprising a body, hook means, and a plurality of wing members co-operating with the body, each of said wing members being positioned at a side of the body and extending outward at a relatively considerable angle, fastening means provided for securing said wing members to said body, the fastening means comprising a flexible member passing through the body transversely to engage a wing member at one side as aforesaid and passing through the body in a reverse direction to engage a wing member upon the opposite side of the body, and then passing through the body again so that the end portions of the flexible member are disposed at the sides of the body in position to be led into engagement with each other around an end of the body.

4. A fishing lure adapted particularly to simulate the vibration of an insect's wings comprising a body, hook means, and a plurality of wing members co-operating with the body, each of said wing members being positioned at a side of the body and extending outward at a relatively considerable angle, said hook having a shank extending lengthwise of the body, and fastening means being provided for securing said wing members to the body, said fastening means comprising a flexible member threaded transversely through the body to engage the wing members at the sides thereof and extending thence to an end of the body to engage the shank.

5. A fishing lure adapted particularly to simulate the vibration of an insect's wings comprising a body, hook means, and a plurality of wing members co-operating with the body, each of said wing members being positioned at a side of the body and extending outward at a relatively considerable angle, said hook having a shank extending lengthwise of said body, and fastening means being provided for securing said wing members to said body at the sides thereof comprising a flexible member threaded transversely through said body so that tension exerted upon the end portions of said flexible member will cause the same to grip the wing members snugly against the sides of said body, said end portions extending to an end of said body to engage said shank from opposite directions to balance the forces created by said fastening means.

6. In a fishing lure, the combination with a body and hook means, of a plurality of wing members comprising shafted feathers secured to said body and with their convex surfaces directed toward each other, one of said members being arranged to lie at an incline to the other member in a direction transverse to the length of the members to form a channel therebetween upon that side of the members remote from the body, said members being arranged also to lie at an angle to the direction parallel to the longitudinal axis of the lure.

7. In a fishing lure, the combination with a body and hook means, of a plurality of wing members of shafted feathers at each side of the body flared at an angle and curved outward from the body, the body having sides tapered toward its front ends, and fastening means securing the quill portions of the feathers directly against said tapered sides, whereby the quill and shaft of each feather are retained in natural substantially straight form.

8. The herein described fishing lure comprising a buoyant body, a shank extending lengthwise of the body, a pair of hooks linked to the rear end of the shank and having their shanks lying in close parallelism and with the barbed portions of the hooks lying in substantially the same plane and remote from the hook shanks, said body having its forward portion tapered on the sides toward the front end, a pair of shafted feathers extending along said tapered sides and having their natural convex surfaces directed toward the body and each other, while their tip portions are curved laterally from each other, tending to shroud the barbs of the hooks, and fastening means securing the quill portion of the feathers against said tapered sides of the body.

In testimony whereof we affix our signatures.

HARRY G. GERE.
EDWARD A. CARPENTER.